(12) United States Patent
Hörmansdörfer et al.

(10) Patent No.: US 6,227,082 B1
(45) Date of Patent: May 8, 2001

(54) PROCESS AND DEVICE FOR MANUFACTURING WORKPIECES WITH NON-CIRCULAR INNER OR OUTER CONTOURS AS WELL AS ECCENTRICALLY POSITIONED ROUND BOREHOLES AND/OR JOURNALS

(76) Inventors: Gerd Hörmansdörfer, Kastanieneck 6 A, D-31303 Burgdorf; Hans Ley, Alefeld 3, D-53804 Much; Wolfgang Westerteicher, Auf der Horst 29, D-33719 Bielefeld, all of (DE)

( * ) Notice: Subject to any disclaimer, the term of this patent is extended or adjusted under 35 U.S.C. 154(b) by 0 days.

(21) Appl. No.: 09/011,870

(22) PCT Filed: Sep. 28, 1996

(86) PCT No.: PCT/DE96/01865

§ 371 Date: Feb. 17, 1998

§ 102(e) Date: Feb. 17, 1998

(87) PCT Pub. No.: WO97/11807

PCT Pub. Date: Apr. 3, 1997

(30) Foreign Application Priority Data

Sep. 28, 1995 (DE) ............................................... 195 36 160

(51) Int. Cl.[7] ....................................................... B23B 1/00
(52) U.S. Cl. ................................ 82/1.11; 82/1.5; 82/11.5; 82/82; 82/86; 82/1.3
(58) Field of Search ............................... 82/1.3, 1.5, 1.11, 82/11.5, 53.1, 82, 86, 88, 99.1, 134; 408/187, 146, 147, 150, 159

(56) References Cited

U.S. PATENT DOCUMENTS

| 1,250,450 | * 12/1917 | Harris ....................................... 82/1.3 |
| 2,661,640 | 12/1953 | Ruegg . |
| 3,134,277 | * 5/1964 | Fritz ......................................... 82/1.3 |
| 4,651,599 | * 3/1987 | Ley ....................................... 82/1.3 X |
| 4,979,852 | * 12/1990 | Noggle ................................. 82/1.5 X |
| 5,396,821 | * 3/1995 | Okumura et al. ......................... 82/1.3 |
| 5,713,253 | * 2/1998 | Date et al. .......................... 82/131 X |

FOREIGN PATENT DOCUMENTS

| 15 52 391 | 4/1970 | (DE) . |
| 32 33 991 A1 | 12/1983 | (DE) . |
| 40 39 489 A1 | 6/1992 | (DE) . |
| 93 112791 | 3/1994 | (EP) . |

* cited by examiner

*Primary Examiner*—Henry Tsai
(74) *Attorney, Agent, or Firm*—Pendorf & Cutliff

(57) ABSTRACT

The invention pertains to a special process and devices for the production preferably by machining of workpieces with non-circular outer and inner contours such as squares, hexagons, ellipses, polygons and the like, or eccentric circular bores and/or tappets. In the claimed process, the workpiece is rotated at constant angular velocity while a tool (e.g. the blade of a lathe tool) set eccentrically in relation to the workpieces if moved without rotating about is own axis at controllable speed in a circular path, workpiece and tool being moved towards one another in cycles with the appropriate advance. This ensures that apart from a small cuttings volume far each advance, very narrow tolerances can be set.

30 Claims, 6 Drawing Sheets

PROCESS AND DEVICE FOR MANUFACTURING WORKPIECES WITH NON-CIRCULAR INNER OR OUTER CONTOURS AS WELL AS ECCENTRICALLY POSITIONED ROUND BOREHOLES AND/OR JOURNALS

BACKGROUND OF THE INVENTION

1. Field of the Invention

The invention concerns a special process and a corresponding device for preferably machining production of workpieces with unround inner and/or outer contours, in particular eccentrically positioned round boreholes and/or journals. Unround contours such as, for example, squares, hexagons, ovals, ellipses or polygons as bore holes or on journals are necessary in the industry for the most diverse applications and in the most varied geometries. Generally known and broadly utilized are, for example, internal hexagons in the heads of screws. For the machining of such screws one could consider essentially shaping processes such as, for example, cold- or warm-press extrusion, since with these processes it is possible to produce pieces with a useable outer surface and at the lowest possible cost per unit. The situation is different when a smaller number of parts are required, or when the respective component cannot be produced by this type of press extrusion process. Above all in the general machine construction industry there is a need for the most varied borehole shapes or, as the case may be, outer contours, and for the machining production of components. Here, with respect to inner contours, resort is conventionally made to broaching or trimming, in some cases also to erosion, or form boring by means of a template, while for the production of outer contours conventionally consideration is given to milling or cutting production.

In the broaching or trimming of shaped boreholes, also in the case of pendulum broaching, this is generally resulting in a more or less strongly grooved surface of the form borehole. The accuracy to gauge or size a borehole produced in this manner is moderate. In the case of harder working materials a higher wearing away of the broaching needle occurs. Additionally, in the case of pocket or dead-end boreholes, there is the disadvantage of the occurrence of trapped metal shavings.

The erosion of form boreholes leads to excellent results, even in hardened materials. However, the time requirement for this type of production is very high, so that this process can in most cases be taken out of consideration due to high costs.

On the other hand, an apparatus for rotative cutting or milling production of form boreholes is known, which is produced by the company VIKA AG in Trimbach, Switzerland, and is sold under the name VIKA-Polybor. This device is essentially comprised of a special borer, which by means of a floating holder can be clamped into a machine spindle and which during the drilling process is guided with the respective desired contour via a hardened template associated with the workpiece. The function of this device is however deficient in the respect that its applicability is very limited. A fundamental disadvantage of this device is the fact that already for geometric reasons a multi-angled drill cannot describe a distinct path within the template, so that the produced contour departs from the contour of the template in a variable manner. Due to the impacting during rotation the outer border edges will, over time, be rounded off in such a manner that in the front side regrinding of the drill the inner measurements of the bore to be produced become smaller and the drill becomes loose in the template. The drill made of HSS is not only expensive to purchase and difficult to regrind, but rather also possesses a particularly impractical or undesirable cutting edge geometry. A fitting or mounting of exchangeable cutting inserts is not possible. It is a further disadvantage, that prior to beginning of the drilling operation the template must be mounted above the workpiece, and the borer must first be introduced into the template with a resting or non-moving spindle, so that a particularly inconvenient manner of operation is produced, which for example cannot be carried out upon an automatic operating machine.

With respect to the cutting production of outer contours today a number of technical possibilities are available, of which milling might be considered to be the closest. However, milling is known to have a small cutting capability per unit of time in comparison to turning. Here special devices are also known such as, for example, the so called multi-edge cutting devices, which produce quite good results with milling machines. This type of multi-edge milling machines however do not permit the production of rounded contours such as, for example, ellipses or three-lobed shapes, and are not usable for example on a CNC lathe with driven tools.

2. Description of the Related Art

A form drilling or form turning device is known from EP-PS 0 513 322, which is suitable for the cutting production of a large number of the most diverse inner and outer contours. This device has the advantage, that it can be mounted upon lathes as well as milling machines, and can even be mounted on column type drilling machines, wherein there is essentially only the need for a rotational drive for the device itself. Thus, even also larger workpieces with higher weight, which for example must be mounted securely upon the work table of a milling machine, can be processed without problem. It can further be employed with lathes which have neither a mechanical nor electronic coupling between the spindle and work tool driver, but rather essentially take advantage of the availability of the spindle-stop or brake. On the other hand, it is a disadvantage of this device, that for each different geometric form or shape and also size a different cam disk set is necessary, from which there follows an increase in investment costs and a corresponding time requirement for equipment change-over. It is further disadvantageous, that without external adjustment of the cutting insert neither an incrementally split-up chipping nor a calibration of the contour can be carried out.

Besides this, from European Patent Document 0 097 346 two principle processes and various devices for the cutting production of this type of contours are known. In the one proposed device the workpiece as well as also the work tool rotate upon a circular path with speeds of rotation differing from each other, wherein the rotating axis of the work tool is displaced eccentrically against the rotating axis of the workpiece. Therewith, by means of a special uneven transmitting driving unit, the rotational speed of the work tool is influenced in such a manner, that from the relative movement between the work tool and workpiece the desired unround contour is produced. Besides this, by means of a predetermined respective radial axis displacement between the workpiece and work tool, the diameter difference between inner and outer circumference of the contour is fixedly established (the term "inner circumference" referring to the radial distance from the workpiece axis of rotation to the nearest machined point on the workpiece; the term "outer circumference" referring to the radial distance from the workpiece axis of rotation to the furthest machined point on the workpiece), just as from the rotation number relationship of the rotating partners the number of edges is determined. Therewith however there is associated the serious disadvantage, that the entire contour must be produced in one single cut. That is, when the work tool unit is moved radially relative to the workpiece, this leads essentially to either a formation of sharply pointed edges or rounding off of the edges of the contour, so that a fine adjustment of the diameter or a segregation into multiple cuts in this way is not possible. From this there results that in part very thick cutting chips are produced, from which not only a frequent breaking of the work tool must be expected but rather also an unclean or unsmooth processing surface. Beyond this, it is necessary for each dimension of the contour, to newly set or adjust the cutting tip or, as the case may be, to exchange the work tool holder or the drill rod with the drill bit, in order that an exact cutting-tip position can be maintained.

In the second process proposed in the same patent document, a workpiece is likewise rotated, the work tool however without its own rotation moves with its tip along a circular orbit lying outside the center of the workpiece, wherein the diameter of this circular path corresponds to the radius difference between the inner and the outer circumference of the contour. Here also uneven speed changes of drive steps are used to produce a variation of the orbiting speed of the work tool, with the relative movement between the workpiece and work tool determined so that during the processing the desired contour is produced. As before, by means of the driven steps a certain transmission ratio can be established herein with respect to the number of edges of the contour which in this case corresponds to the numeric ratio between the workpiece rotation and the work tool orbits. In the proposed process there is the disadvantage, that by the feed of the orbiting work tool tip along a helix lying upon a single circular cylinder neither a split-up chipping nor a calibration during the production of the contour is possible.

The devices proposed in the above document for carrying out the later process are relatively expensive and require a particular construction size which already approaches that of a special machine. Significantly more versatile would however be a construction embodiment in the form of a work tool unit which is compact and machine mountable, such as, for example, on a lathe. In this respect the complex construction of the proposed uneven transmitting drive is certainly an obstacle. Further of disadvantage are the proposed technical solutions for the bearing of the torque or rotation moment forces of the oscillating head in the machine. The embodiment with the illustrated parallel hubs does not make possible a defined angular orientation or positioning of the oscillating head, which would be necessary for an orderly function. The embodiment with pivot arm and linear guidance is not practicable, since in the case of inexact positioning of the work tool cutting edge it causes a distortion of the profile or contour shape and influences the cutting angle of the workpiece cutter. Besides this the bearings for supporting the rotation moment forces described in the reference are not designed to bear the axial forces which occur during cutting or milling.

Thus, there arose the task of providing an improved process and an improved device for the preferably machining production of the contours, which were given above by way of example, on workpieces with increased requirements on the cleanliness or smoothness of the outer surface and the dimensional accuracy of the contour, without the above described disadvantages. Besides this, this type of device should function exceptionally economically and preferably be capable of being installed as after-market compact work tool units upon machines, above all lathes.

The described task is inventively accomplished by the provision.

SUMMARY OF THE INVENTION

The improved process is based upon the second process described in European Patent Application EP 0 097 346, wherein this is improved in that respect, that the orbit axis of the work tool, which itself does not rotate, is adjustable with high precision in the radial direction.

In accordance therewith the workpiece is received within a chuck rotating at a constant angular velocity, for example a of CNC-lathe. The rotational speed of this chuck is set via mechanical, electrical and/or electronic means to establish a particular relationship to the orbiting frequency of the work tool (for example, the cutting tip of a lathe chisel or bit). This relationship is produced from the number of cycles which repeat in the circumference of the contour. Therein, for example, an eccentric journal or pin would correspond to a single cycle of this type, an ellipse with two such cycles, a polygon (so-called three-lobed, constant-diameter shape) with three, a square with four, or, as the case may be, a hexagon with six. In accordance therewith the relationship of the chuck rotational speed to wobble- or tumble-head frequency is 1:1, 1:2, 1:3, 1:4, or as the case may be 1:6. In the workpiece processing the work tool is moved in a circular path without its own rotation and thereby is axially advanced against the workpiece, from which results, for example, the tip of the workpiece being guided in a spatial curve in the form of a screw line. Thereby the rotation direction of the chuck during machining for the production of the mentioned contours must always correspond with the orbital direction of the cutter at the wobble- or tumble-head, irrespective of whether internal or external processing is being carried out. An opposing rotational direction would make possible the production of exotic, flower like contours, for which only a small demand presently would exist.

With the invention it is proposed, that the actual manufacturing process, with which preferably a cutting process is envisioned, is carried out by means of the so-called cutting or machining cycle. Herewith the above described screw line like spatial curves of the work tool cutter are repeatedly shifted radially against each other after each cut with the amount of the radial feeding step until the desired final measurement is achieved.

In the case that it is desired to produce with the described process an eccentrically positioned round borehole or an eccentrically positioned round journal or, as the case may be, an ellipse or a corresponding polygon, then the work tool is moved with constant orbiting speed in an appropriate relationship to the rotational speed of the chuck with the workpiece. In the production of eccentric shapes the radius of the orbit circle of the work tool corresponds thereby to the eccentricity of the journal or, as the case may be, the bore, while the actual diameter thereof is very precisely produced by means of radial displacement of the rotation axis of the worktool.

For the manufacture of uneven or discontinuous varying contours, such as the previously mentioned squares, it is necessary, that the rotational speed of the work tool or its tip is so varied that, despite the constant positioning of the work tool upon a precise circular path, a relative movement is produced between workpiece and work tool, which as a result produces on the workpiece the desired contour.

With the invention there are simultaneously provided devices for carrying out the above described process. These devices are primarily seen as supplemental or after-market work tool units or, as the case may be, supplemental units for carrying out the above described machine processes.

The proposed work tool units include a work tool receptacle, which serves to receive a work tool holder in the form of, for example, a drill rod with an exchangeable cutting insert. The work tool receptacle may selectively be, for example, by means of a cross slide unit, a cardanic or gimbal mounting or within hollow eccentric spindle, secured against the work tool housing against rotation by using, for example, an Oldham-coupling in such a manner that on the one hand its angular relative movement with respect to the housing is avoided, on the other hand however is moveable in such a way that the cutting tip of a work tool (for example an exchangeable cutting insert mounted on a drill rod) is steerable in its radial position or, as the case may be, the mainly radial position. The work tool receptacle is then brought into rotation by a drive means in such a manner, that the work tool tip describes a closed circular path without rotating itself.

The cross-section of the circular path described by the work tool tip depends upon the smallest and the largest radial dimension of the contour to be finished, and must thus be adjustable when various contour sizes are to be produced with the same work tool unit. In this invention it is proposed, that the adjustment is selectively achieved via a radial displacement of one of the work tool receiving associated rotating pivot bearings or mounting units or via the counter-phase rotation of two eccentric jackets or sleeves. The adjustment can be realized by means of, for example, an adjustment screw, a screw drive, a differential screw or a gear driver of beveled gears, or by star wheel and crown wheels. Thereby the adjustment amount can be easily determined by the scaling of the moving components.

In its simplest version the drive for the work tool holder can be coupled directly to the work tool driver of the associated work tool position, for example, upon the revolver of a lathe. The relationship between the rotational speed of the chuck with the workpiece and the wobble or tumble frequency of the work tool holder necessary for establishment of the desired contour is then easily determinable by an NC-Program. A variant is comprised therein, to program the same rotational speed for both drives and for achievement of a specific transmission ratio to rely on a gear unit in the work tool housing. In each of these two cases an appropriate mechanical or electric synchronization possibility on the side of the machine or, as the case may be, the controller, is essential. With the work tool in the here described embodiment it is possible to produce eccentric, elliptic and certain polygons (so called three-lobed constant-diameter shapes).

For the production of edged or other shapes diverging or departing from the above described contours, it is proposed to provide the work tool housing supplementally with an uneven transmitting gear unit, with which by a suitable or appropriate change of the path speed of the work tool and its cutting edge the necessary movement relative to the workpiece can be generated. A gear unit of this type is relatively easily realizable, for example by employment of two unround complementary gearwheels.

For certain edged contours there result for the unround gearwheel sets roller paths with a cardiodic or heart-like shape. These possess at least a curved section with a discontinuous or pointed path which is hardly suitable for the conversion into complementary gearwheels. For this it is now proposed, to replace the pointed curve section by a small radius, which feed with tangential transition into the two sides of the rest of the working curve of the roller paths. By this deviation a small rounding off is produced in the edge areas of the contour provided on the work piece, which happen to be desired anyway. The produced rounding-off admittedly provides no clear radius, but however its exact shape is inconsequential in principle for the function of the worked-out surfaces.

According to a further invention it is proposed, that the unround complimentary gearwheels are constructed or designed as so-called a double screw gear drive. A double screw gear drive comprises spur gears which however with respect to conventional spur gears exhibit a helix angle of approximately 80°, so that the wheels can possess only a single tooth—similar to a single-threaded screw. Double screw gears with unround wheels have hitherto not been known. They have the advantage that they, with respect to the rolling path, make possible the realization of curves with substantial discontinuities. Besides this they are quite simple to manufacture, for example, using a thread cutting cycle upon a lathe and using a tool device for unround processing as herein described. Besides this, double screw gears can be designed to be self-locking in one rotational direction, so that for example in the case of a machine crash the work tool holder caught up by the chuck would not be able to damage the internal drive of the revolver.

For the practical realization of the uneven transmitting gear constructive freedom is allowed within certain preconditions. On the basis of straight or whole number roller path diameter relationships there results the possibility for increasing or decreasing the wobble or tumble frequency of the work tool holder with respect to the rotational speed of the drive. Besides this the drive can be produced as a planetary gear or, as the case may be, drive of an annular gear with planetary gearwheel, whereby a too-far projecting of the work tool unit from the drive axis can be avoided.

BRIEF DESCRIPTION OF THE DRAWINGS

The essence of the invention shall now be described in greater detail by reference to the three drawings. FIG. 8 shows a double helical gearing as the unround complimentary gears. For the illustrations a schematic-like representation of a work tool unit is provided, in order that the essence of the invention could be more easily understood. The selected dimensioning thus arises from the illustrative simplification. Likewise, construction components or sub-assemblies, which are conventional for assembly, are not taken into consideration. Small parts such, as for, example screws, securing rings, seals and the like were omitted for similar reasons, since those of ordinary skill in the art would readily be able to make a practical embodiment without problem. The work tool units are shown in section with the majority of the components of their construction.

DETAILED DESCRIPTION OF THE INVENTION

Figure 1:
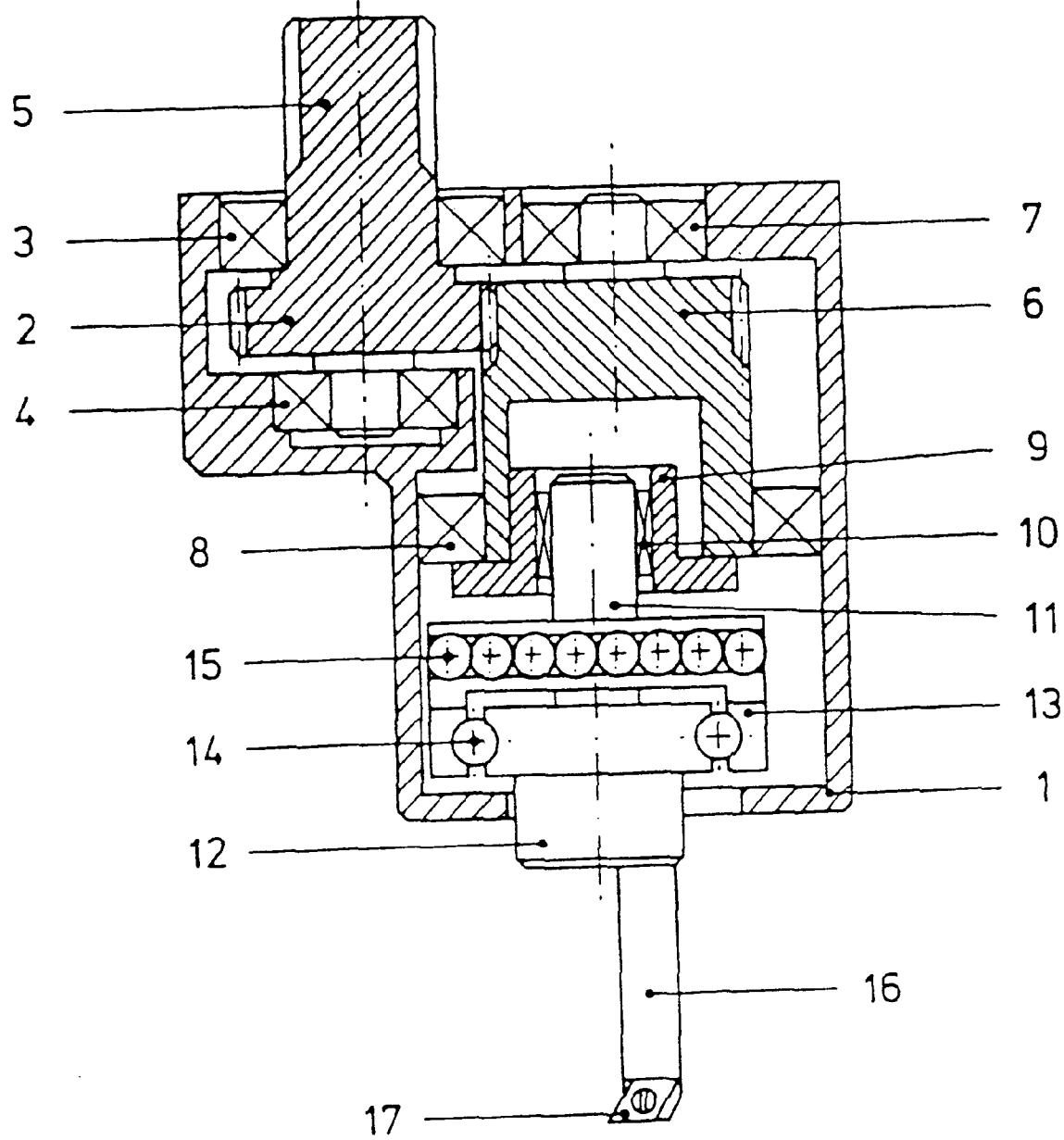
FIG. 1 shows a work tool unit in accordance with the invention for mounting upon the revolver of a lathe, FIGS. 2 and 3 respectively show a similar work tool unit with a different construction of the work tool receptacle.

The work tool unit shown in FIG. 1 is comprised of a housing 1, in which the drive pinion 5 is rotatably mounted by means of two roller bearings 3, 4. The side of the drive pinion facing the housing is provided with a gearwheel 2, while the other side is provided with teeth, which are provided for coupling to the machine side drive means. The further connection elements for coupling to the drive on the machine side were omitted. The gearwheel 2 engages in the teeth of a driver 6 rotatably mounted in roller bearings 7, 8, in such a manner that a rotational movement is transmitted to it. In a practical construction embodiment these gearwheels are provided as changeable gearwheel sets, whereupon a constructional freedom is made possible, by determination of the relationship of the number of teeth, to determine the internal transmission ratio or, as the case may be, by the employment of unround complimentary gearwheels, for the realization of a speed variation of the work tool tip as necessary for production of a particular contour. On the driver 6 there is mounted a radially adjustable supporting block 9 as an eccentric bearing, wherein the elements for securing and for adjustment and determination or reading of the eccentric displacement are not shown. In this connection it is proposed, that the housing 1 is provided with a coverable through hole, in order for example to provide access to the mounting block for an adjustment or set key or, as the case may be, to be able to read off the adjustment setting. Within the mounting block there is indicated a roller bearing in the form of a needle bearing 10 which receives a round shaft 11 in such a manner that the rotative movement of the driver 6 and the mounting block 9 are uncoupled from the tool receptacle 12 and only an eccentric movement is transmitted. Thereby the work tool receptacle 12, functioning as a wobble head, which here is formed together with a cross-frame 13 as cross-sliding member, is deflected in the radial plane both in the x- as well also in the y-axis, whereupon the size of its deviation or deflection depends upon the eccentric value and its movement path runs in a circle. So that the work tool receptacle can reliably complete its task, it is supported by means of a stiff anti-friction mounting in the cross-frame 13 to the housing. The roller body columns 14, 15 are represented in the drawing as spheres. In the practical embodiment one can resort to even stiffer alternatives such as for example a linear bearing with crosswise introduced cylindrical rollers. The mount of the cross-frame need only support a relatively short roller path, however a high oscillating frequency. It must be constructed as free from play as possible, in order to achieve a high true-to-form production of the contour. In the work tool receptacle 12 a drill rod 16 is seated for the production of an inner contour of a workpiece. On its front end an exchangeable cutting insert 17 is screwed on. The position of the cutting tip was therein so selected, that it comes to lie precisely upon the middle axis of the work tool receptacle. Thereby the lever forces acting upon the work tool receptacle are small. This design is however not essential, since the true-to-contour path of the work tool tip can be achieved also in other positions.

For the production of outer contours it is necessary to rotate the direction of the indicated cutting insert by 180°, for example by appropriately rotated re-assembly of the drill rod in the work tool head, or by mounting of the radially positioned work tool holder as conventional for outer cutting procedures.

In the shown work tool unit additional fixed or adjustably provided masses could be integrated in the area of the eccentric bearing in order to compensate for the inertial forces generated by the eccentric orbit. In fact, the inertial forces occurring during operation are not very high, since the orbit path in principle is relatively small. In the illustrative example the work tool head is approximately 3 mm off-center, so that the diameter of the orbital circle is approximately 6 mm. With this setting it would yet be possible to produce a hexagon with an across-flats dimension of approximately 78 mm.

Figure 2:
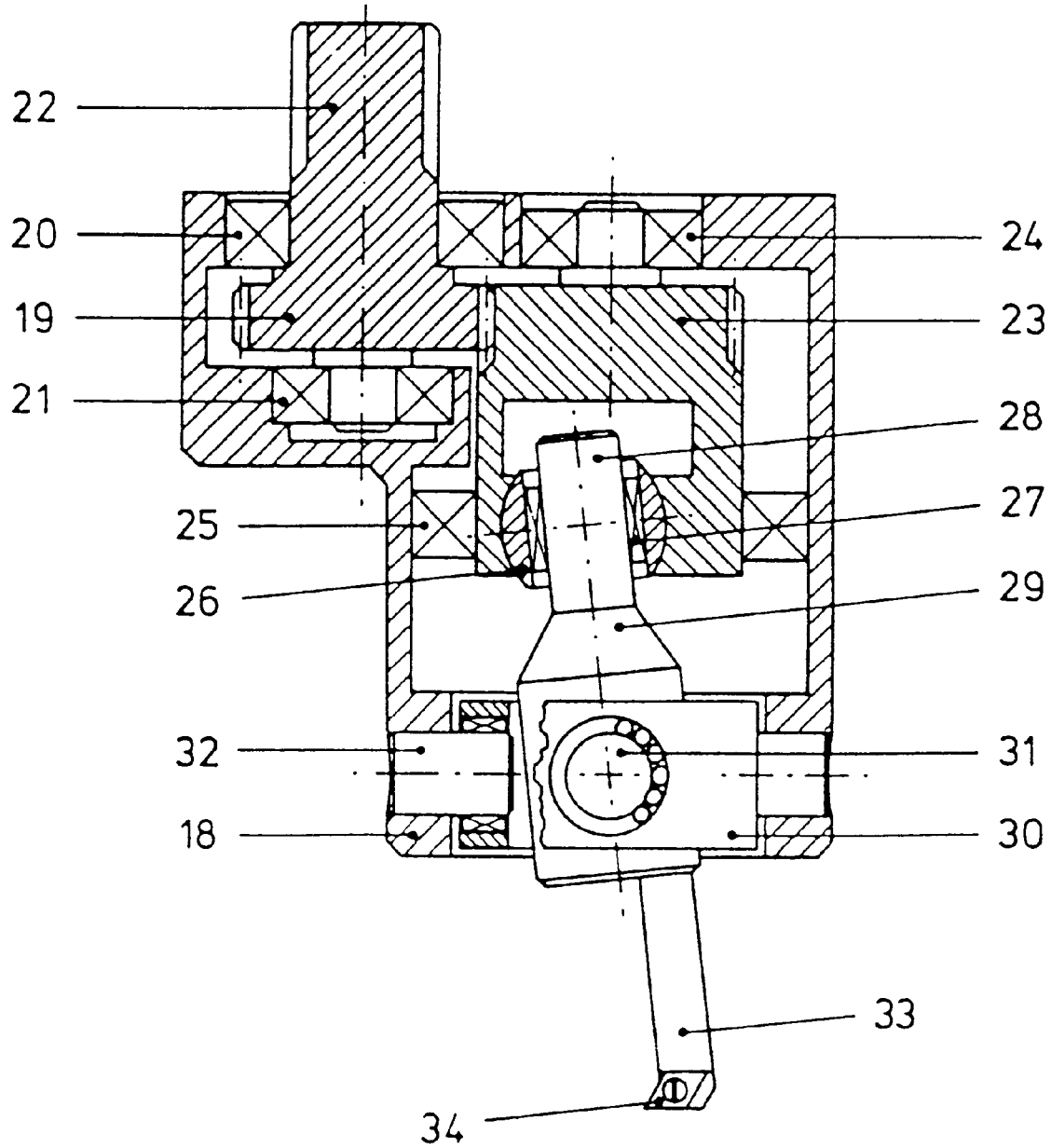

The schematic example in FIG. 2 is similar in its representation with respect to that shown in FIG. 1. Various shapes and dimensions were maintained. The shown work tool unit is comprised of a housing 18 in which a drive pinion 22 is rotatably mounted by means of two roller bearings 20, 21. The side of the drive pinion 22 entering into the housing is provided with a gearwheel 19 while the side directed away from the housing possess teeth, which are provided for the coupling to the machine side drive. The further connection elements for machine-side section are omitted. The gearwheel 19 engages in the teeth of a driver 23 rotatably mounted by means of roller bearings 24, 25 in such a manner that its rotational movement is transmitted to it. In a practical construction embodiment these gears are provided as exchangeable gearwheel sets, whereby the constructive freedom is provided, by calculation of tooth-number relationships, to determine the internal transmission ratio, or as the case may be by the utilization of unround complimentary gearwheels for the provision of rotational speed variations as necessary for the production of a particular contour of the work tool tip. In the driver 23 a radially adjustable mounting block not shown in greater detail is supported as eccentric mount, which includes a receptacle in the form of an inner spherical zone for a spherical-shaped or spherical-zone shaped mounting shell 26. Therein the elements for supporting of the mounting block itself, and also for the adjustment and reading off of the eccentric displacement, are not shown. With respect thereto it is proposed that the housing 18 is provided with a coverable through-hole, for example, for the purpose of reaching the eccentric bearing with a key for adjustment or, as the case may be, to read the set position. Within the bearing shell 26 a roller bearing in the form of a needle bearing 27 is shown, which receives a round shaft 28 in such a manner that the rotative movement of the driver 23 and the eccentric spherical shell 26 are uncoupled from the tool receptacle 29 and only its eccentric movement is transmitted. Therein the tool receptacle 29, working as a tumble head, which here is cardanically coupled in roller bearings together with a partially broken away represented ring 30 and displaced pin pairs 31, 32, with its extremities moving in essentially the same orbital direction along a circular path phase-shifted by about 180° with respect to each other. A drill rod 33 for finishing a contour situated within a workpiece is shown in work tool receptacle 29. On its front end an exchangeable cutting insert 34 is screwed on. The position of the cutting tip is thereby so selected, that it comes to lie exactly upon the center axis of the work tool receptacle. Thereby the leverage forces working upon the tool receptacle are small. This design is particularly recommended for this type of construction, since it leads to the smallest amount of axial movement displacement of the work tool tip. The work tool tip is namely in arbitrary paths always moved along a spherical surface in space, of which the middle point corresponds with that of the cardanic coupling or attachment. The distortion of the contour resulting thereby always increases in an ever increasing amount as the spacing increases from the work tool unit central axis. Generally they are, based on their size, able to be compensated by being taking into consideration in the design of the uneven transmission gear. However, then a bow-shaped wavelike beginning and end of the cut segment must be accepted on the workpiece. It is further to be taken into consideration, that in this type of construction the amount or magnitude of the projection of the work tool tip has an influence on the circular diameter described by it, and therewith upon the finished contour. Therefore, for example, the length of the drill rod or, as the case may be, the position of the work tool tip must always be precisely maintained. On the other hand, herewith the possibility is provided, by willingly different adjusting the projecting length without an internal adjustment of the eccentric bearing, to produce other contour dimensions. Similar adjustment possibilities are further realizable by a displacement of the cardanic plane against the plane of the eccentric bearing.

With the shown work tool unit there can, to a limited extent, also other processing work be carried out when the radial distance of the cutting tip of the work tool is not too large. Herein the cutting direction of the shown exchangeable cutting insert must be rotated about 180°, for example by transplanting the appropriately rotated drill rod in the work tool head.

An advantage of the here proposed construction type is found therein that the occurrence in operation of inertial forces from the beginning are very small, since the diameter of the respective orbiting circle from the extremity of the work tool head to the middle of the cardanic bearing continuously decreases. Besides this the orbiting inertial masses are partially compensated anyway by their 180° phase shifted position. Additionally, fixed or moveable masses can be provided integrated in the shown work tool unit in the area of the eccentric bearing, in order to achieve an even better compensation of the inertial forces arising from the eccentric orbit.

Figure 3:
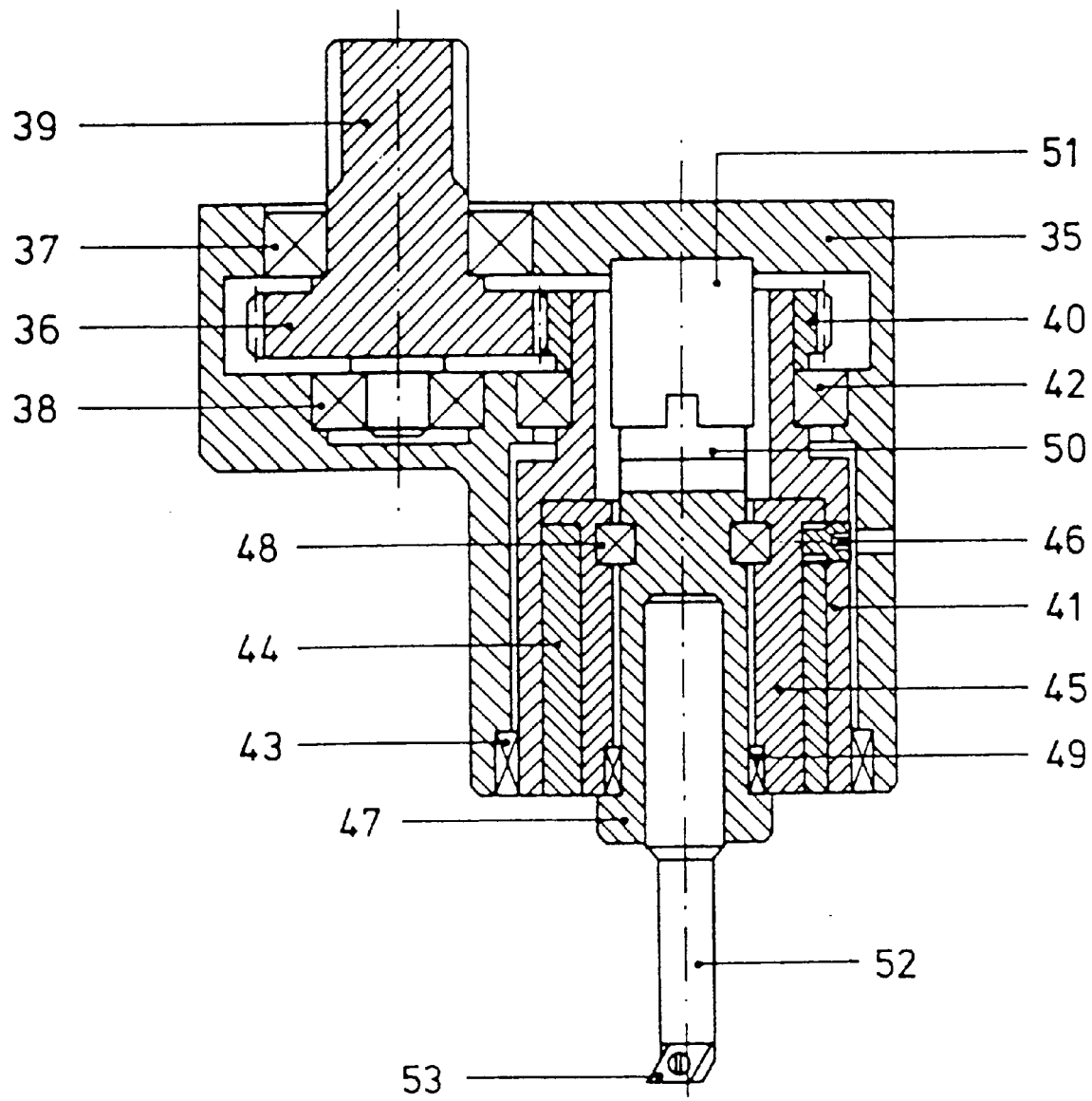

A further variant of the inventive device is shown in FIG. 3, wherein as before for the purpose of better comparison the dimensioning of the drawing FIGS. 1 and 2 is maintained. Pinion 39, which is mounted in housing 35 with roller bodies 37, 38, serves for coupling of the work tool unit to the machine side drive. The teeth of the gearwheel 36 engage in the teeth of a second gearwheel 40, which is pressed upon a hollow spindle 41. The hollow spindle is, in turn, mounted upon a shoulder bearing 42 and on a roller bearing 43 rotatable within the housing 35. It receives a set of eccentric sleeves 44, 45, which are rotatable counter-phasic against each other by means of a gear 46, in order that the diameter of the orbital circle of the work tool can be adjusted. Therein gearwheel 46 is a normal spur gear, in comparison to which the toothing on the eccentric sleeves are so-called crown gearings.

For the purpose of the relative rotation of the two eccentric sleeves other adjusting elements can be employed, for example worm gears, bevel gears, set screws, differential screws or the like. By means of the relative rotation of the two eccentric sleeves a straight lined adjustment in the radially facing direction of the cutting tip is made possible. The degree of the adjustment can be read from a scale provided on the moving components. Particularly simple is a front side scale upon the outwardly exposed ring flanges of the eccentric sleeves, by placing a reference mark in the form of a line upon the face flange of one of the eccentric sleeves, and on the other a scale with numeral values. This scaling simultaneously offers an increased reading precision because of its counter-phase rotational direction.

The two eccentric sleeves require both with respect to each other as well also to the hollow spindle a free-from-play mounting, in to order to securely prevent in operation the occurrence of oscillating. Since the desired freedom from play is difficult to attain with cylindrical fittings with rigid construction components, it is in this respect recommended that at least one of the fitting components be designed conically and the corresponding eccentric sleeve be constructed for example as split taper sleeve. Through axial clamping it is then possible to make, from the elemental hollow spindle and outer and inner eccentric sleeves as individual components, a securely fitted unit under tension. As an alternative it is proposed to form the outer eccentric sleeve as a hydraulic clamping bushing, which is expandable by means of a pressure screw acting upon the hydraulic medium.

The inner-lying eccentric sleeve 45 receives via a shoulder bearing 48 and a needle bearing 49 a work tool receptacle 45 which by means of an Oldham-coupling 50 and a mooring post 51 is mounted secure against rotation against the housing. In the place of the Oldham-coupling other floating couplings for parallel shaft displacements are employable, for example, a metal bellows, a Schmidt-coupling, a Helicoflex-coupling, or the like.

In the workpiece receptacle 47 there is introduced a drill rod 52 for the working of an unround inner contour. The conventional clamping of the drill rod in the work tool receptacle by means of a threaded pin is not shown in the illustrative representation. Upon the drill rod an exchangeable cutting insert 53 is attached with a screw. In the case that the processing of an unround outer contour is desired, the drill rod must be exchanged out with an appropriate work tool holder. The tip of the turning cutting insert is then oriented 180° out.

Figure 4:
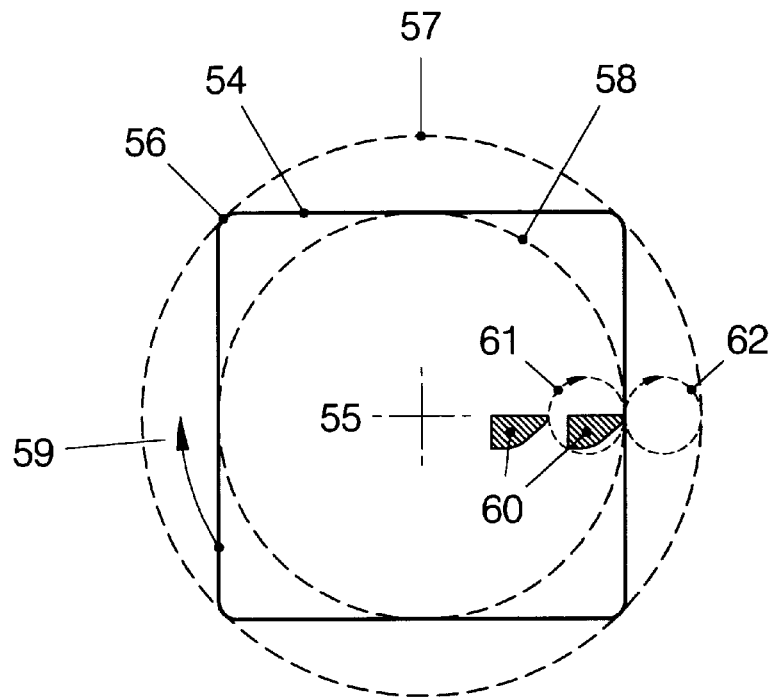
FIGS. 4 and 5 schematically showing the kinematic basis of the process of the present invention.
Figure 5:
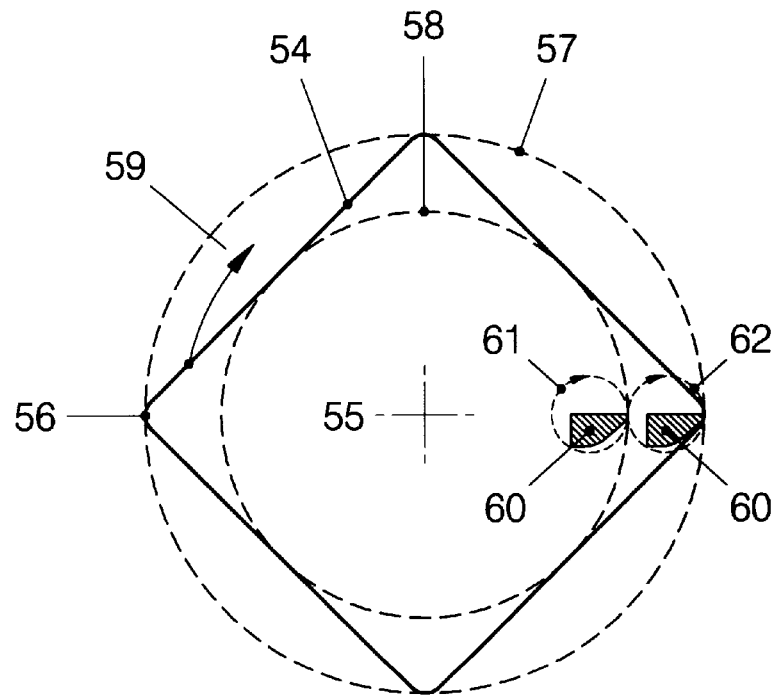

FIGS. 4 and 5 schematically show the kinematic basis of the process of the present invention. A contour to be produced in the form of a square 54 with rounded corners 56 is shown in solid lines. The center- and rotation-point of the shown square contour is indicated with designation 55. The direction of rotation of the workpiece to be processed into which the square recess is to be machined is represented with arrow 59. The contour can define an imaginary outer circumference 57 and an imaginary inner circumference 58. In FIG. 4 the contour is shown in a particular angular position. In accordance therewith the position of the cutting tool 60 is shown, at the beginning of the processing and also at the last cut, wherein in the case of the square the cutting tip describes a circular motion four times during one rotation of the workpiece. The initial circular motion 61 and the final circular motion 62 are shown with arrows, in order to indicate the direction of motion of the cutting tip.

Figure 6:
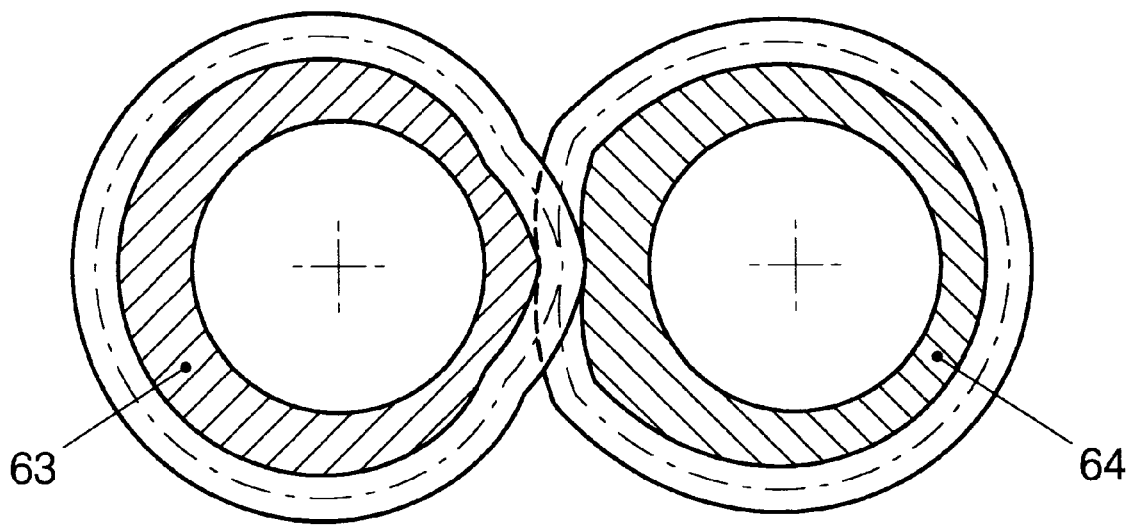
FIGS. 6 and 7 show unround complimentary gears as conventional in the art, and which are responsible for the production of changes in angular speed of the worktool for the production of the square contour as shown in FIGS. 4 and 5.
Figure 7:
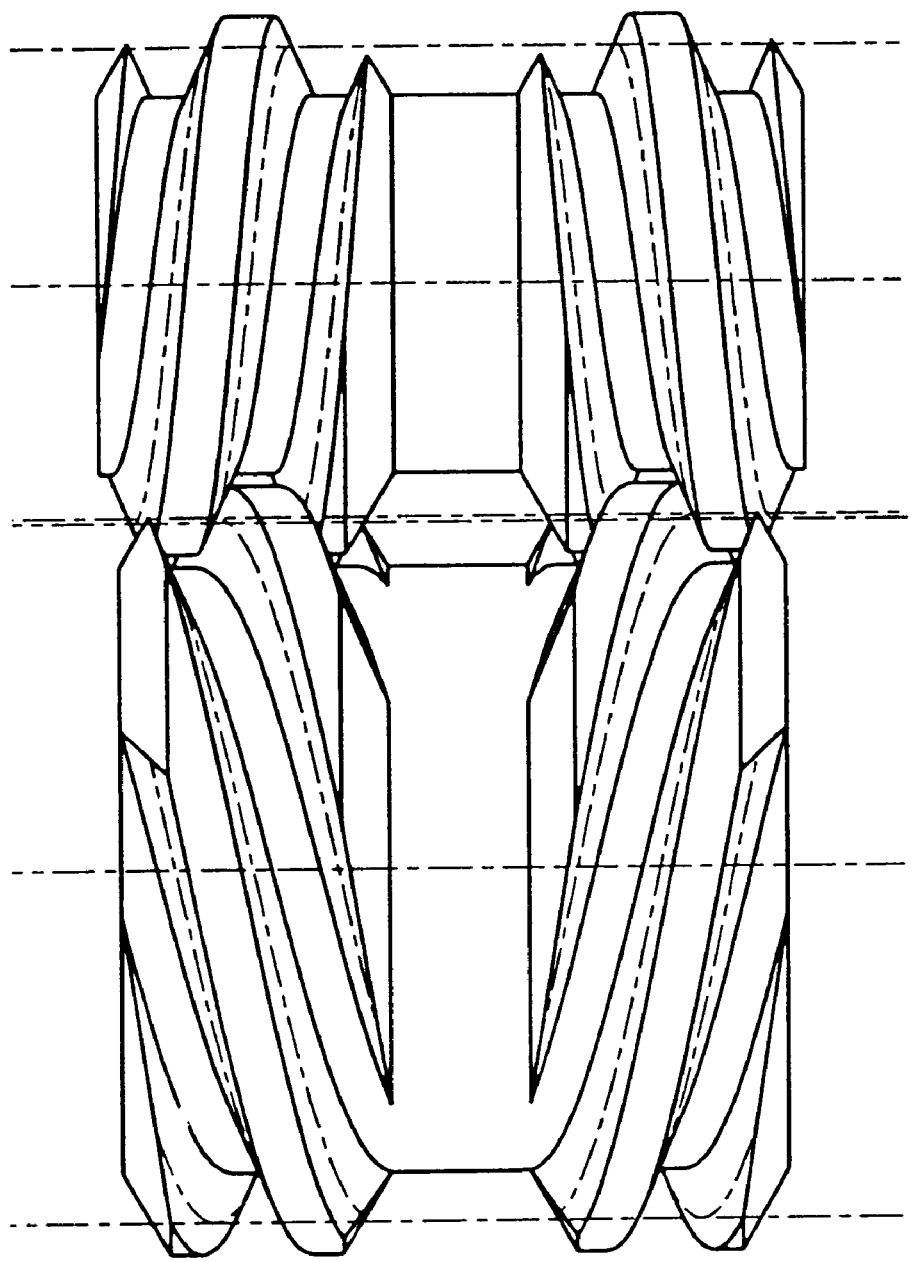

FIG. 6 shows unround complimentary gears which are conventional in the art if having longitudinal or diagonal gear teeth, and which are responsible for the generation of changes in angular speed of the worktool for the production of the square contour as shown in FIGS. 4 and 5. The drive gear 63 engages a driven gear 64. The gear teeth could be, for example, double helical gear teeth, as shown in FIG. 7, or longitudinal or diagonal gear teeth.

With the invention both a process and appropriate device for carrying out the process are provided, with which both eccentric journals and boreholes as well also as the most diverse outer and inner contours can be manufactured on workpieces in the shortest amount of processing time and with high precision. Thereby there can be realized during the machining process both a split-up chipping as well as narrow tolerances of the dimensions. The device is very compact and economical to produce and can be retrofitted on a number of various machines.

What is claimed is:

1. A process for machining a workpiece during rotation of said workpiece about an axis to produce a desired contour, said process comprising:

rotating said workpiece to be processed with constant rotational speed about a fixed workpiece axis, wherein said workpiece has a contour being machined, wherein said contour has an imaginary inner circumference and an imaginary outer circumference, said inner circumference representing the radial distance from the workpiece axis of rotation to the nearest machined point on the workpiece, said outer circumference representing the radial distance from the workpiece axis of rotation to the furthest machined point on the workpiece;

driving a work tool with at least one cutting tip such that said cutting tip describes a circular motion orbiting about an orbit axis, without rotation of the cutting tip, which circular motion when from the outside is tangential to the inner circumference of the contour and when, from the inside is tangential to the outer circumference of the contour, wherein said orbit axis lies half-way between said workpiece contour inner circumference and outer circumference, wherein the rotational speed of the workpiece and the orbiting speed of the work tool on it's orbiting path are dependent upon each other and the speed of the work tool during its orbit is so adjusted, that the desired outer contour is produced by the fixed rotation of the workpiece and the actual position of the work tool in its circular motion, wherein said desired contour is produced in multiple processing steps, wherein (a) said work tool relative to said workpiece moves axially in a helical-screw path during each processing step, (b) the work tool after each processing step is advanced a fixed amount radially against the surface being processed, and (c) said process steps (a) and (b) are repeated until a final measurement of said desired contour is achieved.

2. A process as in claim 1, wherein said contour defines a borehole in said workpiece.

3. A process as in claim 2, wherein said borehole has a center axis which is offset from said workpiece axis of rotation.

4. A process as in claim 3, wherein said borehole has a cylindrical contour.

5. A process as in claim 2, wherein said borehole has an unround contour.

6. A process as in claim 5, wherein said journal has an unround contour.

7. A process according to claim 1, wherein said contour defines a journal.

8. A process as in claim 7, wherein said journal has a center axis which is offset from said workpiece axis of rotation.

9. A process as in claim 8, wherein said journal is cylindrical.

10. A device for machining a workpiece rotating with a constant rotational speed about a rotation axis to produce a contour, wherein said contour has an imaginary inner circumference and an imaginary outer circumference, said inner circumference representing the shortest radial distance from the workpiece axis of rotation to the contour, said outer circumference representing the largest radial distance from the workpiece axis of rotation to the contour, said device comprising:

a cutting tool having a cutting tip;

a cutting tool holder for holding said cutting tool, a receptacle for releasably receiving said cutting tool holder;

a drive unit for driving said receptacle, said drive unit having an input and an output, an input shaft having a fixed rotation axis, said input shaft connected at one end to a drive means, wherein said input shaft, drive unit and said receptacle share a common fixed housing, wherein said input shaft drives said drive unit, wherein said drive unit input drives said drive unit output such that said drive output describes a circular motion, wherein said drive unit output is coupled to said housing fixed against rotation but radially displaceable to describe said circular motion, wherein said circular motion movement of said driver unit output causes said receptacle, said cutting tool holder, and said cutting tool tip to describe a circular motion without rotation of the cutting tip, which circular motion from the outside is tangential to the inner circumference of the contour and from the inside is tangential to the outer circumference of the contour, wherein the cutting tip describes an orbit axis which lies half-way between said workpiece contour inner circumference and outer circumference, and wherein the orbital movement of said cutting tool circular motion is synchronized to said rotating work piece.

11. Device according to claim 10, wherein said coupling of said drive unit to said housing is via a floating cross-slide unit (13, 14, 15).

12. Device according to claim 10, wherein said coupling of said drive unit to said housing is via a floating a cardanic coupling (30, 31, 32).

13. Device according to claim 10, wherein said coupling of said drive unit to said housing is via an Oldham-coupling (50), a corrugated bellows, a Helicoflex-coupling, or a Schmidt-coupling, and wherein the axial relative movement of the work tool receptacle with respect to the housing of the device is prevented via a roller bearing.

14. Device according to claim 10, wherein the work tool receptacle extends from a bearing pin (11, 28), which is mounted by means of a bearing (10, 27) in a radially or eccentrically adjustable mounting block (9).

15. Device according to claim 10, wherein the work tool receptacle is driven by a driver rotating about an axis, and in formed as a tumble head (29) and is pivotably mounted with a spherical or spherical zone shaped mounting shell (26) in a radially adjustable mounting block with an adjustable angle relative to the rotating driver axis (23).

16. Device according to claim 10, wherein force is transmitted from the input shaft to the drive unit input via a transmission with unround complimentary gears.

17. Device according to claim 16, wherein one of the gears is a ring gear and the other is a planet gear.

18. Device according to claim 17, wherein the gears have gear teeth running axially or diagonally to the axis of rotation.

19. Device according to claim 16, wherein said transmission is a double screw drive.

20. Device according to claim 10, wherein said common fixed housing is supplementally provided with an uneven transmitting gear unit comprising unround gears having roller paths, wherein at least one of the roller paths is derived from a cardiodic profile of which any pointed section is replaced by an arc, which transitions tangentially into both sides of a working curve.

21. Device according to claim 10, wherein the housing (1, 18, 35) and the input shaft (5, 22, 39) are formed to be compatible with a conventional interface of a lathe.

22. Device for machining a workpiece rotating with a constant rotational speed about an axis to produce a contour, wherein said contour has an imaginary inner circumference and an imaginary outer circumference, said inner circumference representing the shortest radial distance from the workpiece axis of rotation to the contour, said outer circumference representing the largest radial distance from the workpiece axis of rotation to the contour, said device comprising:

a cutting tool having a cutting tip;

means for moving said cutting tool such that its cutting tip describes a circular motion orbiting about an orbit axis, without rotation of the cutting tip, which circular motion is tangential when from the outside to the inner circumference of the contour and is tangential when from the inside to the outer circumference of the contour, wherein the orbit axis lies half-way between said workpiece contour inner circumference and outer circumference;

wherein said cutting tool is secured to a work tool receptacle directly or via a tool carrier, wherein the work tool receptacle is connected with the housing of the device via a floating coupling which completely prevents rotational relative displacement and allows parallel displacement, and selectively the same floating coupling or a rolling bearing is used to prevent axial relative movements, wherein the work tool receptacle (47) is mounted in at least one eccentric sleeve and is angularly adjustable with respect to a rotating hollow spindle (41), in order to make adjustable the radial position of the work tool tip.

23. Device according to claim 22, wherein the work tool receptacle (47) is mounted in an eccentric sleeve pair (44, 45) and wherein the eccentric sleeve pair is rotatable inversely phased against each other via a gear.

24. Device according to claim 23, wherein the outer eccentric sleeve is a hydraulic clamping sleeve.

25. Device according to claim 23, wherein the adjustable drive is formed by at least partially gearing two eccentric sleeves (44, 45) and providing a pinion (46) in engagement with both eccentric sleeves.

26. Device according to claim 25, wherein said an at least partial gearing of the two eccentric sleeves (44, 45) is as a bevel gear or a crown gear.

27. Device according to claim 22, wherein at least one eccentric sleeve has a conic inner or outer surface and optionally a slit or split taper, and is tensionable by axial sliding against a second sleeve.

28. Device according to claim 22, wherein at least one eccentric sleeve and one adjacent sleeve include outwardly exposed ring flanges, and wherein one of said flanges is provided with at least a reference mark and the other of said flanges is provided with a scale.

29. A device for machining a workpiece rotating with a constant rotational speed about a rotation axis to produce a contour, wherein said contour has an inner circumference and an outer circumference, said inner circumference representing the shortest radial distance from the workpiece axis of rotation to the contour, said outer circumference representing the largest radial distance from the workpiece axis of rotation to the contour, said device comprising:

means in a fixed housing for driving a tool holder receptacle to describe a circular motion, wherein for each rotation of said workpiece, said tool holder receptacle describes said circular motion a whole number multiple of times, wherein said means for driving said tool holder receptacle is fixed against rotation yet radially displaceable to describe a circular motion via a coupling mounted in said housing principally coaxial to the motion path of said driving means.

30. A device for machining a workpiece rotating with a constant rotational speed about a rotation axis to produce a contour, wherein said contour has an imaginary inner circumference and an imaginary outer circumference, said inner circumference representing the shortest radial distance from the workpiece axis of rotation to the contour, said outer circumference representing the largest radial distance from the workpiece axis of rotation to the contour, said device comprising:

a stationary housing;

a cutting tool having a cutting tip, said cutting tool mounted on a work tool holder;

an elongate work tool receptacle having a first end and a second end, said work tool holder connected to said work tool receptacle second end, a drive unit for driving said work tool receptacle, said drive unit having an input and an output, said output connected to said work tool receptacle first end, and an input shaft for driving said drive unit input, wherein said work tool receptacle is coupled to said work tool housing secured against rotation relative to said work tool housing, wherein said drive unit output drives said work tool receptacle first end to describe a circular motion without rotating such that said work tool receptacle second end, said work tool holder, and said cutting tip describes a circular motion without rotating, said cutting tip orientation at every position being parallel, and wherein the movement of said work tool tip along said circular motion of is synchronized to said rotating workpiece.

* * * * *